Patented Apr. 10, 1934

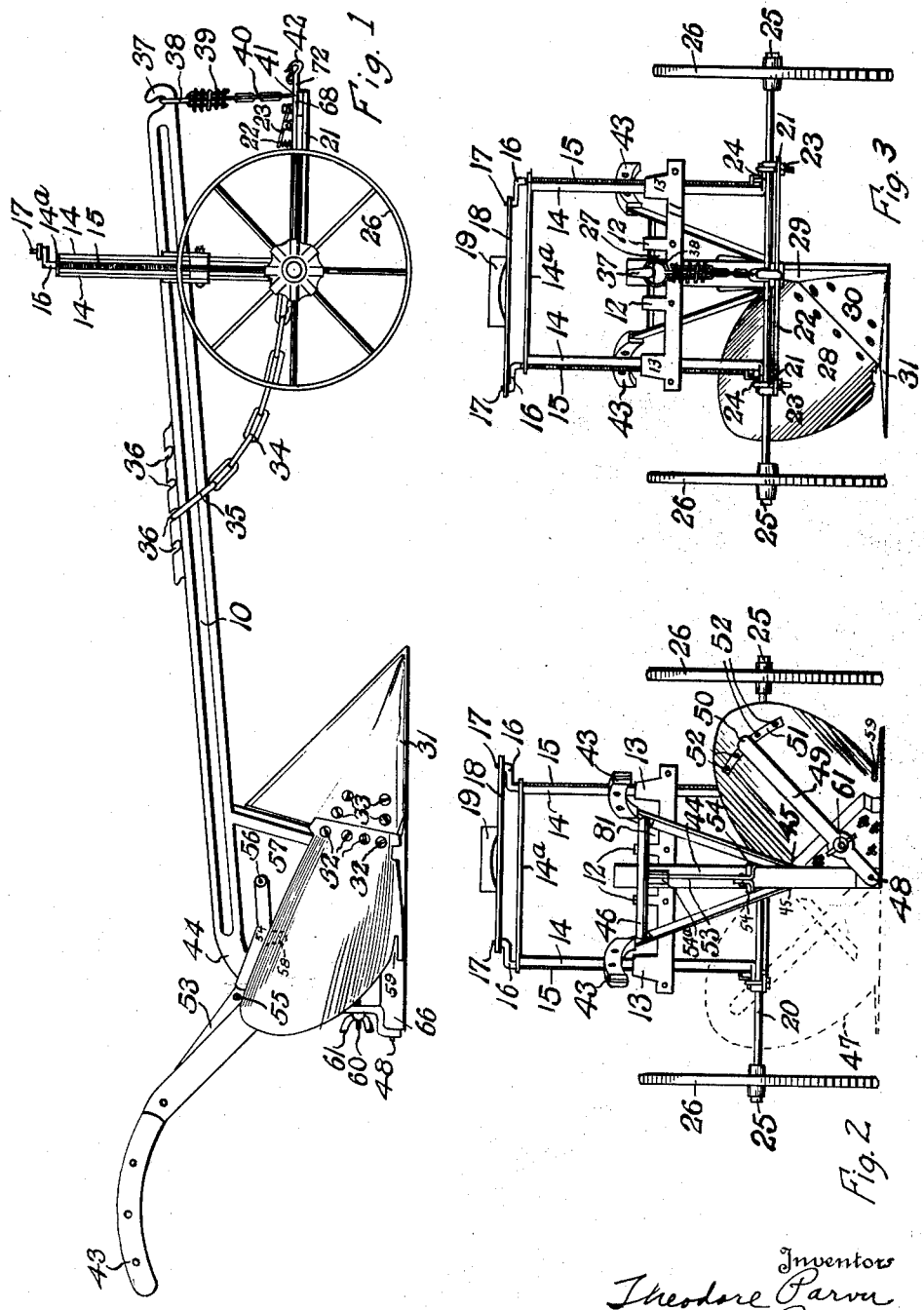

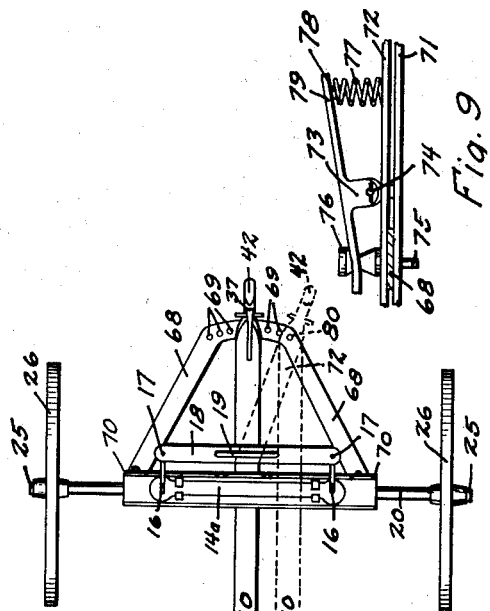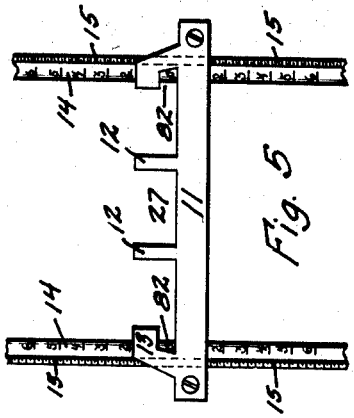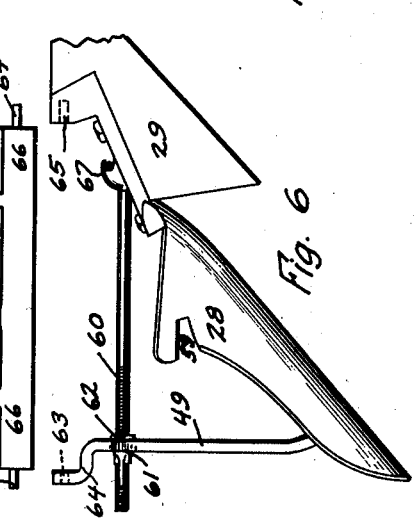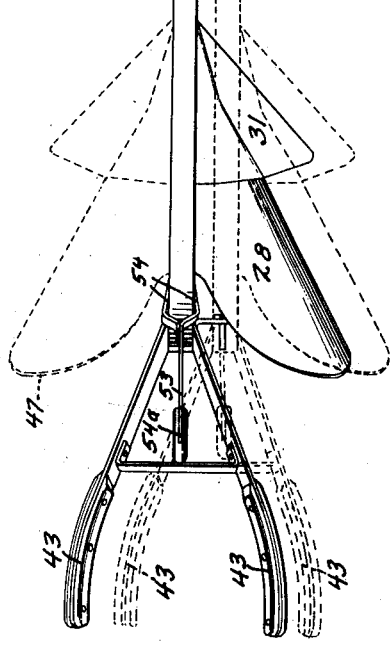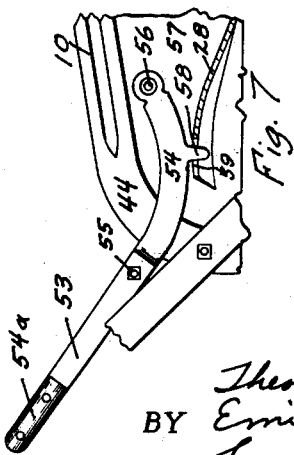

1,954,223

UNITED STATES PATENT OFFICE 1,954,223

PLOW

Theodore Parvu and Emil T. Parvu, Sioux City, Iowa

Application April 15, 1932, Serial No. 605,466

2 Claims. (Cl. 97—131)

Our invention relates to a plow which can be reversed and adjusted for any cutting depth.

An object of our invention is to provide a plow which can be reversed at the end of the furrow without the necessity of going around the field to start the furrow at its previous starting point.

A further object of our invention is to provide a plow which will accomplish the above object very readily by merely pivoting the plow about a pair of wheels.

A further object of our invention is to provide a plow which can be readily adjusted so that the plow will cut in various desired depths.

A further object of our invention is to provide a plow which can be adjusted so the plow will travel in a straight line and so the horses drawing the plow can travel in another line so that the furrow can be cut close to an obstructing medium which would otherwise obstruct the path of the team of horses.

A further object of our invention is to provide a plow which can be readily reversed at the end of the furrow and which upon the return furrow will enable the operator of the plow to swing the cutting edge about its axis so that the earth will be thrown the same way as it was thrown in the first mentioned furrow.

A further object of our invention is to accomplish the above results by means of methods most convenient and simple of manufacture.

A further object of our invention is to provide means for removing the cutting tool of the plow for various adjustments and so forth.

With these and other objects in view, our invention consists in the construction, arrangement, and combination of the various parts of our device whereby the objects contemplated are attained, as hereinafter more fully set forth, pointed out in our claims, and illustrated in the accompanying drawings, in which:

Figure 1 is a side elevation of the plow,

Figure 2 is a rear view of Figure 1,

Figure 3 is a front view of Figure 1,

Figure 4 is a plan view of the plow,

Figure 5 is a detailed broken away view of the height adjusting mechanism,

Figure 6 is a detailed view of the share removed,

Figure 7 is a detailed view of the adjustable lever which holds the plow share in position, Figure 8 is a detailed view showing the engagement of the threaded studs with the height adjusting bar, and Figure 9 is a detailed view of the forward adjusting pin.

I have used the reference character 10 to indicate the principal beam of the plow. This beam rests upon the cross bar 11, which includes the upstanding projections 12 and the threaded portions 13.

The cross bar 11 slides up and down along the frames 14, and the threaded portions 13 are engaged with the long studs 15. These studs terminate at their upper ends in the angled portions 16 which include the vertical members 17. The upper brace of the frame is indicated at 14a.

The vertical members 17 pass through the plate 18, which includes the handle piece 19.

The lower end of the frame 14 is suitably secured to the axle housing 20 by means of the U bolts 21, the plate 22 and the nuts 23.

The lower end of the frames 14 are bent outwardly as at 24 to allow the U bolt to support these frames.

The usual axle 25 passes through the housing 20 and terminates in the wheels 26.

The end of the beam 10 usually rests in the U shaped opening 27, which is included between the upstanding projections 12.

It will now be seen that by grasping the handle 19 and reciprocating this handle around and back and forth so that the angled portion 16 will rotate about the stud as an axis, that the beam 11 will be carried either upwardly or downwardly. This will adjust the cutting depth of the plow share, which we designate generally by the character 28.

The plow share 28 includes the extended members 29, 30 and 31 of the usual construction.

The member 28 is secured to the main body of the share by means of the screws 32, and the member 30 by means of the screws 33.

To provide a further and finer adjustment of the cutting depth of the plow, we provide the chain 34 which is suitably secured to the axle at its mid point.

The chain 34 is attached to the larger link 35, which is received within the openings 36 which are cast integral with the beam 10 along its upper edge.

By placing the link 35 in the rear openings 36, it will be seen that the forward carriage end of the plow will be thrown backwardly and the cutting depth correspondingly decreased since the plow share will be elevated and in the reverse manner by placing the link 35 in the forward openings 36, the cutting depth will be increased since the beam thus will be dropped accordingly. In this way we obtain a further adjustment.

The beam 10 includes the hook portion 37, which receives the link 38. The link 38 is secured to the spring 39 and the further chain 40 is attached at 41 to the side adjusting feature, which will be explained.

The plow is drawn from the usual type of snap hook 42.

It will now be seen that as the furrow is cut, the earth will be thrown to that side to which the plow shares are secured to the frame.

When the operator comes to the end of the furrow he can lift the plow from off the ground by means of the handles 43, which are secured to an extension 44 of the beam 10 at 45.

The handles 43 are braced by the member 46. When the plow is thus lifted off the ground at the end of the furrow by using the wheels 26 as a pivot, the plow is swung around and the team of horses merely describe an arc and are then ready to go back on the return furrow.

However to allow the earth to be thrown in the same direction as in the previous furrow, it will be necessary to swing the plow 28 around to the other side as indicated by the dotted lines at 47 in Figures 2 and 4.

To accomplish this result we provide the pin 48 about which is swung the brace 49, which is secured to the plow at 50 by means of the member 51 and suitable fastening means 52.

To retain the plow in its desired position, we provide the lever 53 to which is pinned the handle 54a. (See Figure 7.)

The lever 53 includes the arced portion 54, which is identical on both sides of the members 44 and which members are bolted together at 55.

The member 54 includes a pin 56 which passes through the cast portion 57, which is integral with the beam 10.

The pin 56 thus engages both elements 54 on either side of the plow so that the lever 53 can be swung pivotally on this pin in upward or downward movement.

The member 54 also includes the downwardly extending portion 58 which is received within the slot 59 in the plow.

It will be seen that when the lever 53 is pushed down at the handle 54a, that the portion 58 will be within the slot 59, and the plow will be securely held in its desired place.

However when the lever 53 is moved upwardly by means of the handle 54a, the portion 58 will not be engaged in the slot 59 and the plow can then be swung around the pin 48 as an axis to the opposite side of the plow frame, and the lever then be forced downwardly into its receiving slot when the plow will be securely held on the other side of the frame. This is by virtue of the fact that there are two slots such as 59 at either side of the plow element 28. (See Figure 1.)

For locking the plow to the main frame, we provide the stud 60, which is threadably engaged with the wing-nut 61.

A nut 62 is provided to brace the member 49 when in use.

When it is desired to remove the plow, the wing-nut 61 is turned so that it moves backwardly on the stud 60, and the member 49 is then free to move rearwardly and off of the pin 48.

The member 49 is suitably pivoted at the point 50 so that this action will take place. In this way the plow can be removed since when the member 49 is moved rearwardly as explained, the opening 63, which is included in the angled portion 64, will slip off of the pin 48 and then by moving the plow slightly forwardly, the pin 64' will be free from engagement with the opening 65 which is included in the forward end of the plow share.

The lower portion of the plow frame includes the extended members 66, which include the pins 48 and 64.

The stud 60 is pivoted at 67 to allow a pivotal movement.

We will now describe a further important feature of our invention.

Quite frequently when plowing land, a furrow must be cut adjacent a fence, a small hill, or a wall or other obstructing medium. In this event usually the furrow cannot be cut close to the obstruction. We have provided a feature in our invention which will eliminate this. This feature is provided for as follows:

We provide the frame 68 which includes the small openings 69. The frame 68 is secured rigidly to the axle housing at 70. The members 71 and 72 (see Figure 9), are pivotally secured by suitable means to the front part of the axle housing. This feature is not shown on the drawings but is accomplished by any usual method of pinning and so forth.

By virtue of this construction the frame 68 is absolutely rigid, but the framework 71 and 72 is free to slip along the forward part of the frame 68. The hook 42 is secured at the end of the member 72.

Mounted on the member 72 is the lever 73 which is pivotally secured by means of a pin 74, and this lever terminates in the pin 75, which pin includes the integral member 76.

The forward end of the lever 73 includes a slot which slips around the member 76 as shown.

A compression spring 77 is provided at the rear of the lever 73 and is kept in place by the projection 78.

Assuming that a furrow is to be cut near an obstruction as mentioned, which is on the right hand side of Figure 4, it will be seen that by depressing the lever 73, by pressing down on the end 79, the pin 75 will be forced out of engagement with the central hole in the frame 68, and the members 71 and 72 will be slid along until this member takes the position as shown in the dotted lines in Figure 4.

The pressure is then released on the end 79, and the pin 75 will engage the small hole 80. The beam 10 can then be lifted over into the opening 81 (see Figure 2), and the entire arrangement will then take the position as shown in the dotted lines in Figure 4.

The plow share will then be positioned closer to the obstructing medium and although the horses pulling the plow can then be driven so that they are on the left hand side of the plow, it will be seen that the furrow will be cut close to the obstruction without the necessity of the horses passing over the same obstruction, which in some cases would be impossible.

If this arrangement were not provided and the horses pulled the plow as shown in the solid lines in Figure 4 even though they pulled the plow and were moved over to the left hand side, the furrow would not be cut in a separate line past the obstruction.

The same operation will take place if it is desired to cut a furrow on the left hand side corresponding to Figure 4.

Figure 8 shows more clearly the threaded engagement of the stud 15 with the beam 11 where the stud 15 engages the threaded portion 81.

For adjustment of the beam 11, we provide the scales as shown in Figure 5 which are marked on the frames 14.

It will be seen from Figure 5 that the neutral point will be at zero as shown, and we provide the cutout portion 82 so that the figures can be readily seen, and the scale is graduated with any number of figures upwardly and downwardly so a desired adjustment can be attained. In this way the desired cutting depth can be set.

It should be explained here that the chain 34 absorbs all of the strain when the plow is pulled, since the plow is drawn from the hook 42. For this reason it is made of a series of strong links.

It will be seen that we have provided a plow which combines several desirable features, among which is a plow which can be reversed at the end of a furrow.

It will be seen further that we have provided a plow which can be adjusted for any cutting depth and which can be adjusted to cut a straight furrow directly beside obstructing mediums.

It will be seen finally that we have provided a plow of this nature which is readily adjustable in all of its features and which provides arrangements for removing any of its parts for adjustments and repairs and so forth and which is simple and easy of manufacture.

Some changes may be made in the construction and arrangement of the parts of our invention without departing from the real spirit and purpose of our invention, and it is our intention to cover by our claims any modified forms of structure or use of mechanical equivalents which may be reasonably included within their scope.

We claim as our invention:

1. A plow comprising a lengthened beam including a downwardly extending rear portion, a plow share pivotally mounted in locked position to the rear portion, a vertical wheeled frame carrying a cross beam having a plurality of recessed openings, adjustable means for allowing placement of the beam in any one of the recesses, including a horizontal frame attached to the wheeled frame having a series of openings, and a pair of strips including a pin arranged to slide over the horizontal frame to allow engagement of the pin with any one of the openings, and means for adjusting the height of the forward end of the beam, including a pair of studs threadably engaged with the cross beam, and means for simultaneously rotating the studs about their axes.

2. A plow comprising a lengthened beam, a plow share, a wheeled frame positioned to carry the forward end of the beam, means attached to the frame to allow vertical adjustment of the beam end to vary the cutting depth of the plow share, said means including a cross beam and a pair of studs threadably engaged with the cross beam, and means for simultaneously rotating the studs about their axes, comprising crank shaped members terminating the upper ends of the studs, a cross bar handle having openings received on the said crank shaped members, means for swinging the plow share from one side of the plow to the other, and means for locking the plow share in desired position.

THEODORE PARVU.
EMIL T. PARVU.